United States Patent Office 3,194,794
Patented July 13, 1965

3,194,794
PROCESS OF PREPARING POLYMERS OF NU-
CLEARLY POLYCHLORINATED AROMATIC DI-
CARBOXYLIC ACIDS AND DIAMINES HAVING
AT LEAST 4 CARBONS
John R. Caldwell and Russell Gilkey, Kingsport, Tenn.,
assignors to Eastman Kodak Company, Rochester,
N.Y., a corporation of New Jersey
No Drawing. Filed Jan. 27, 1960, Ser. No. 4,870
3 Claims. (Cl. 260—78)

This invention relates to polymers of nuclearly polychlorinated aromatic dicarboxylic acids and diols or diamines having at least 4 carbons. These polymers are fiber-forming and have high melting points approaching at least 200° C. and are much higher in especially advantageous embodiments. An unobvious process is provided for the polyamides using aryl diesters as a starting material.

The prior art contains a number of disclosures relating to the preparation of condensation polymers using chlorinated dicarboxylic aromatic acids. However, such disclosures are rather general in nature and where they are more specific they relate to the preparation of polymers which are inherently unstable and not commercially satisfactory for the known uses for such polymers.

Thus, the prior art discloses the polyester of 2,5-dichloroterephthalate and ethylene glycol; cf. the following two references: Bull. Soc. Chim. France, Nos. 8/9, 1234 (1956), and J. Chem. Soc. Japan, Ind. Chem. Sect., 57, 214 (1954) [C.A., 49, 2774 (1955)]. In both references the melting point of the polymer, as quoted, is quite low for application as a synthetic fiber or film. In the former article, a purified sample of the polyester melted at 140-142° C. The material as prepared melted at 80-85° C. These polymers were also of relatively low molecular weight. Intrinsic viscosities were less than 0.2. The tendency of the polymer to develop color and degrade on heating was ascribed to the labilizing influence of the o-chloro atoms.

In view of the published data on polyesters from 2,5-dichloroterephthalic acid, one would also expect to obtain low-melting, low molecular weight or unstable polyesters with other glycols. This is especially true since the lowest member in the homologous series of glycols, ethylene glycol, gives a polymer melting over 100° lower than the corresponding polyester with terephthalic acid. However, it was surprising to find that polymers could be prepared from 2,5-dichloroterephthalic acid and higher glycols which melted in the same range as the corresponding terephthalic acid polyester. In addition, the presence of the chlorine atoms increases the modulus of the polymer markedly over that of the terephthalic acid polymer. The polyesters of this invention are also quite stable and can be built up to high molecular weights with practically no color formation.

As regards polyamides, particular difficulty was encountered because aromatic acids contained halogen in the ortho or para position decarboxylate fairly rapidly. Thus, it was impossible to prepare high molecular weight polyamides from either the free acids or their diamine salts. The temperatures required for polyamide formation are generally so high that even when a polyamide can be obtained from a halogenated aromatic dicarboxylic acid the polymer has a low molecular weight corresponding to an inherent viscosity of less than 0.2. It was found that the alkyl esters of the chlorinated aromatic dicarboxylic acids are not sufficiently reactive in an aminolysis reaction to give high molecular weight polymers. Quite surprisingly it was found that the aryl diesters were reactive and could be used in the preparation of highly advantageous highly polymeric polyamides derived from diamines having at least 4 carbon atoms.

It is an object of this invention to provide novel highly polymeric linear condensation polymers of chlorinated dicarboxylic acids and the bifunctional compounds containing at least 4 carbon atoms.

Another object of this invention is to provide a process for preparing such polymers which are polyamides using an aminolysis reaction involving an aryl diester of the chlorinated aromatic dicarboxylic acids.

It is a further object of this invention to provide stable highly polymeric polyesters and polyamides from chlorinated aromatic dicarboxylic acids by virtue of the presence within the polymeric structure of recurring moieties derived from diols and/or diamines having at least 4 carbon atoms.

Other objects will be apparent elsewhere herein.

According to one aspect of this invention there is provided a highly polymeric linear condensation polymer of a polychloro-aromatic dicarboxylic acid and a bifunctional compound containing at least 4 carbon atoms selected from the group consisting of glycols and diamines, said polymer being limited to constituent starting materials and radicals in and on the linear chain selected from the group consisting of hydrocarbon, hydroxy, carboxy, amino, chloro, oxy, sulfide, sulfonyl, amide, ester and other groups disclosed hereinafter, the polymer being characterized by being fiber-forming, having an inherent viscosity measured in 60 parts of phenol and 40 parts of tetrachloroethane of at least 0.5, and having a melting point of between about 180°-200° C. and about 325°-350° C.

These condensation polymers have unexpected utility because of their high degree of stability, their high melting points, their resistance to burning, their resistance to biological attack by living organisms, their excellent color qualities, their increased modulus of elasticity, etc.

The theory as to why the present invention is accompanied by the success mentioned is difficult to develop and is a part of the reason underlying the unobviousness of the invention. As already mentioned, those skilled in the art would expect, among other difficulties, that the labilizing influence of chlorine on the aromatic nucleus would tend toward deleterious results such as discoloration, etc. However, the theory as to this invention is of no consequence to its patentability.

Among the glycols which can be used in preparing polyesters in accordance with the present invention the straight chain aliphatic glycols containing from 4-12 carbon atoms and the cycloaliphatic glycols such as 1,4-cyclohexanedimethanol (cis or trans) are preferred. Another advantageous group of glycols include those containing one or more aromatic nuclei which may be directly connected or with groups such as oxy, sulfonyl, divalent hydrocarbon radicals, etc. Examples of the aromatic glycols include p-xylylene glycol, 2,2'-(p-phenylenedioxy)-diethanol, 2,2'-(2,5-dichloro-p-phenylenedioxy)diethanol, 2,2'-(2,5-di-t-butyl-p-phenylenedioxy)diethanol, etc. Less advantageous glycols include aliphatic glycols having branched chains especially when the branching is unsymmetrical.

Various classes of diamines can be used for preparing polyamides. Preferred diamines include the straight chain aliphatic diamines having the structure

$H_2N(CH_2)_nNH_2$ where $n$ is 4-12. Of particular value are the branched chain aliphatic diamines such as 3-methylhexamethylenediamine, 2-ethylhexamethylenediamine, 3-methylheptamethylenediamine, etc. Amines containing an alicyclic nucleus can be advantageously used, as represented by 1,3-diaminocyclohexane, 1,4-diaminocyclohexane, 1,4-cyclohexanebis(methylamine), 2,5 - norcamphanebis-(methylamine), etc. Amines containing an aromatic nucleus can also advantageously be used, as represented by p- or m-xylene-$\alpha,\alpha'$-diamine, chlorinated xylene-$\alpha,\alpha'$-diamines, etc. Aromatic diamines such as methylenebisaniline and isopropylidenebisaniline are also suitable. Diamines containing oxygen or sulfur linkages can also be used, as represented by 3,3'-ethylenedioxybis(propylamine), 3,3'-thiobis(propylamine), etc. Also suitable are the N- and N,N'-alkylated diamines such as N-methylhexamethylenediamine, N,N'-diethyl-1,4 - cyclohexanebis(methylamine), etc.

Polyester amides can be produced in accordance with this invention by using a mixture of glycol and diamine. If more than 50 mole percent of the mixture is diamine, it is especially desirable to employ the process described below for preparing polyamides using the aryl diester of the dicarboxylic acid. This becomes especially important when the amount of diamine approaches 75–100% of the mixture of diol and diamine.

Copolyesters and copolyamides can be prepared using mixtures of two or more glycols, two or more diamines, and supplementary dicarboxylic acids such as the aliphatic, aromatic and alicyclic types well known in the art and illustrated in a great number of patents, e.g. terephathalic acid, 4,4'-diphenic acid, 4,4'-oxydibenzoic acid, 4,4'-ethylenedibenzoic, 4,4'-ethylenedioxydibenzoic, trans-cyclohexane-1,4-dicarboxylic, 4,4'-sulfonyldibenzoic, and the aliphatic dicarboxylic acids, e.g. succinic adipic, glutaric, 3-methylglutaric, suberic, pimelic, sebacic, etc.

In preparing polyesters in accordance with this invention, it is advantageous to heat an excess of glycol with an ester of the 2,5-dichloroterephthalic acid or other chlorinated aromatic dicarboxylic acid or mixture of acids in the presence of a suitable polyesterification catalyst such as an aluminum alkoxide, a titanium alkoxide, sodium, zinc acetate, mixtures of such compounds or any of the other such compounds well known in the prior art. The first step of the polyesterification reaction can be carried out at a temperature of about 150°–250° C. to produce the ester interchange resulting in prepolymer formation. The ester employed can be a dialkyl ester of the chlorinated aromatic dicarboxylic acid at temperatures up to about 250° C. since the necessity of using an aryl diester is primarily based upon the effect of temperatures in excess of about 250° C. upon stability of monomer or very low polymer. However, the aryl diester can be advantageously employed at any operative temperature. The first step in the preparation of the polyester involves the removal of alcohol or phenol formed by ester interchange with the consequence production of low molecular weight polymer. Continuation of the reaction results in the removal of excess glycol and the elimination of residual quantities of alcohol or phenol. At this stage of the reaction the temperature can be raised to 240–300° C. or higher depending upon the melting point of the polyester, and since the glycol moieties (4 or more carbons in a chain) in the polymeric structural configurations contribute stability to the chlorinated aromatic dicarboxylic moieties, the high temperatures do not produce degradation and other deleterious effects.

According to one method of preparing the polyester the final phase of the polymerization can be carried out under a vacuum with good agitation in order to facilitate the escape of volatile products from the highly viscous melt. It is important to exclude oxygen and moisture during the polymerization.

Alternatively, the polymer including polyamides can be made by the solid-phase process. When this method is used, a prepolymer having a viscosity of 0.2–0.35 is made by stirring the melted polymer in vacuum as described above. This prepolymer is then removed from the vessel and pulverized to a particular size of 0.01–0.03 inch. The pulverized prepolymer is then heated in vacuum or in an inert gas stream at a temperature slightly below the melting point of the polymer for several hours.

The solid-phase polymerization process is applicable to both polyester preparation as well as polyamide formation. The degree of polymerization of the prepolymer can be varied between about 0.1 to about 0.5 units as measured by the inherent viscosity. The expression prepolymer is commonly used in the art to denote a polymer which has not yet achieved the degree of polymerization which is being sought. The size of the particles of the prepolymer powder is not critical but is primarily a matter of convenience with larger particles raising problems as to heating thereof. The preparation of polymers using the solid-phase process is described in the prior art and in copending applications such as Coover et al. Serial No. 788,043, filed January 21, 1959.

As mentioned above, the polyamides prepared in accordance with a particularly unobvious aspect of this invention are made by a process wherein the chlorinated aromatic dicarboxylic acid is employed in the form of its aryl diester. This is especially important when the aromatic dicarboxylic acid is the sole acid employed or constitutes at least 75 mole percent of the dicarboxylic acids being employed. The aryl diesters preferably include phenyl, tolyl, and xylyl diesters. These aryl radicals may include other alkyl, aryl, halogen or other superfluous radicals which serve no particular advantage. The phenyl diesters are preferred. The phenyl esters (or other aryl diesters) of the aromatic chlorinated dicarboxylic acids can be prepared by reacting the dicarboxylic acid chloride with phenol (or other related phenols). Alternatively, the aryl diester such as the phenyl diester can be made by reacting the aromatic chlorinated dicarboxylic acids with an aliphatic acid ester of the phenol in the presence of a suitable catalyst. This can be accomplished by heating the dicarboxylic acid with the phenyl ester of a lower-boiling acid and distilling off the low-boiling acid (e.g. acetic acid or propionic acid). This process which can be used for preparing the phenyl esters of any of the high melting insoluble acids and is especially valuable in preparing the aryl diesters of the chlorinated aromatic dicarboxylic acids although it can also be employed in preparing the esters of terephthalic acid, isophthalic acid, trans-cyclohexane-1,4-dicarboxylic acid, etc. as well as being also applicable to all monocarboxylic and dicarboxylic acids which are stable under the conditions of reaction; thus the process can be used for the preparation of good yields of diphenyl fumarate, etc. For example, the diphenyl ester of 2,5-dichloroterephthalic acid can be prepared by heating one mole of the acid with 6.5 moles of acetic anhydride to form a clear solution to which 2.2 moles of phenol and 0.0075 mole of stannous chloride dihydrate are added with stirring whereby the reaction mixture includes phenyl acetate in solution. If desired the pheny lacetate could be formed separately and then added. Upon heating an exothermic reaction begins and a solid is formed in the solution. The solution is then heated over a period of several hours so as to remove distillate as the temperature gradually increases. When the distillation is complete the reaction mixture is stirred for a while at above its melting point and the reaction mixture is then purified by recrystallizing from acetic acid and slurried in sodium carbonate solution, washed, and dried whereby the diphenylester of 2,5-dichloroterephthalate is obtained. Besides stannous chloride dihydrate other catalysts which can be employed include phosphoric acid, zinc acid sulfate, polyphosphoric acid, boric acid, zinc chloride, cuprous chloride, boron trifluoride, magnesium acetate, lead acetate, titanium butoxide, benzenephosphoric acid, phosphoric acid, silica alumina, etc.

Suitable chlorinated, aromatic dicarboxylic acids are listed below: where X=hydrogen, alkyl or chlorine and at least one X=chlorine.

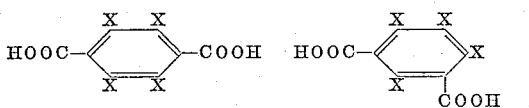

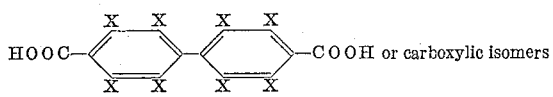

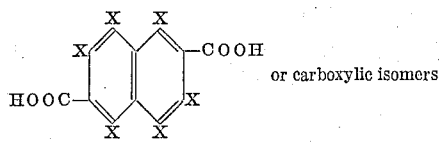

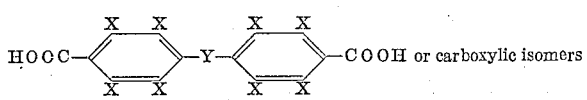

where Y=oxygen, sulfur, —SO$_2$—, or alkylene (straight or branched chain)

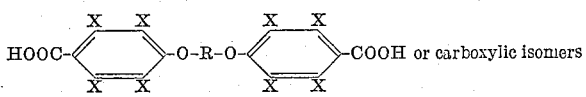

where R=alkylene (straight or branched chain).

The aryl diesters of these acids can be prepared as described above.

The preferred acid is 2,5-dichloroterephthalic acid and the preferred ester is the phenyl diester.

According to a preferred procedure the polyamides are made by heating together equivalent amounts of the phenyl ester and diamine. The first stage of the heating cycle may be carried out under pressure in order to prevent the escape of volatile reactants. It is possible to run the reaction at atmospheric pressure when high-boiling reactants are used or the reaction is run in a high-boiling solvent. Suitable solvents are phenol, cresol, p-toluenesulfonamide, diphenyl ether, etc. Dowtherm solvent (a diphenyl-diphenylether mixture) is a convenient solvent since it is a solvent for the reactants and low-molecular weight polymer but not for the high-molecular weight polymer. During the course of the heating cycle, the polymer separates from the solution of liberated phenol in solvent and the solvent can be drawn off or removed by distillation at reduced pressure. An inert atmosphere is maintained over the reaction mixture during any of the methods used. Heating is usually carried out in the range, 150°–350° C., for several hours with stirring. The final stage of the polymerization may be carried out in the melt at atmospheric pressure in an inert atmosphere, or under vacuum.

This embodiment of the invention can be defined as a process as described above wherein said aryl diester and said diamine are heated under a vacuum at from 200°–350° C. until a prepolymer is obtained having a degree of polymerization corresponding to an inherent viscosity of from about 0.1 to about 0.5, said prepolymer is pulverized to form a powder, and the prepolymer powder heated at below the melting point and above about 175° C. until a polymer powder is obtained having an inherent viscosity of 0.5–3.0.

This invention can be further illustrated by the following examples of preferred embodiments although it will be understood that these examples are included merely for purposes of illustration and are not intended to limit the scope of the invention unless otherwise specifically indicated.

*Example 1*

A mixture of 26.3 g. (0.1 mole) of dimethyl-2,5-dichloroterephthalate and 18 g. (0.2 mole) of tetramethylene glycol was placed in a reaction vessel equipped with a stirrer, a distillation column, and an inlet for purified nitrogen. A solution of 0.02 g. of titanium tetrabutoxide in 1 ml. of butyl alcohol was added as catalyst. The reaction mixture was stirred at 210–220° C. in an atmosphere of nitrogen. Methyl alcohol was distilled from the vessel until about 0.17 mole was collected. The temperature was then raised to 250° C. and held for 15 minutes. A vacuum of 0.1 mm. was applied and stirring was continued for 2 hours. The resulting polymer had a high melt viscosity and very slight color. The inherent viscosity, as measured in a solvent consisting of 60 parts phenol and 40 parts tetrachloroethane, was 0.76. The microcrystalline melting point, as determined under crossed nicols on the hot stage of a microscope, was 215–218° C. A comparison of the properties of molded test specimens with those of polytetramethylene terephthalate is given in the following table:

| | Heat distortion temperature, °C.[1] | Impact strength, p.s.i. | Tensile strength, p.s.i. | Elong., percent | Tension modulus, p.s.i. |
|---|---|---|---|---|---|
| Polytetramethylene terephthalate | 203–222 | 27 | 6,950 | 95 | 1.8 |
| Polytetramethylene 2,5-dichloro-terephthalate | 210–225 | 29.8 | 10,950 | 48 | 2.5 |

[1] 1st figure is 1% extension at 55 psi. 2nd figure is 2% extension at 55 psi.

*Example 2*

A polymer was prepared from dimethyl-2,5-dichloroterephthalate and ethylene glycol by the method used in Example 1. This polymer had an inherent viscosity of 0.35 and a melting point of 160–173° C. and was generally inferior and not satisfactory for further investigation as to fibers, film, photographic support, etc.

*Example 3*

The following ingredients were placed in a reaction vessel equipped with a stirrer, a distillation column, and an inlet for purified nitrogen: 26.3 g. (0.1 mole) of dimethyl-2,5-dichloroterephthalate, 21.6 g. (0.15 mole) of 1,4-cyclohexanedimethanol (70:30 trans-cis isomers), and 1 ml. of butyl alcohol containing 0.02 g. of titanium tetrabutoxide. The ester interchange reaction was carried out at 220° C. An atomsphere of nitrogen was maintained over the melt. After the methyl alcohol had been removed by distillation, the temperature was raised to 270° C. and held for 15 minutes. A vacuum of 0.4 mm. was applied for 10 minutes to remove the excess glycol and form a low-molecular weight polymer with an inherent viscosity of about 0.3. This prepolymer was removed from the flask and ground to a particle size of 0.02 inches. It was then further built up by solid-phase polymerization. The powdered prepolymer was heated under a vacuum of 0.2 mm. with stirring at 225° C. for 3 hours. The resulting high-molecular weight polymer had an inherent viscosity of 0.83 and a microcrystalline melting point of 235–256° C. It is useful in the manufacture of fiber, film, and plastic.

Example 4

A polymer was prepared from 2,5-dichloroterephthalic acid, dimethyl ester, and 2,2-dimethyl-1,3-propanediol by the procedure described in Example 1. The crystalline melting point of this polymer was 186–202° C. It is very stable to hydrolysis and is valuable in the production of film and plastic where higher melting point is not essential.

Example 5

A polymer was prepared as described above containing equivalent amounts of terephthalic and 2,5-dichloroterephthalic acids combined with 1,4-cyclohexanedimethanol. The polymer had an inherent viscosity of 0.92 and melted in the range of 243–258° C. It is useful for the production of film and plastic.

Example 6

The polymer obtained as described above by reacting dimethyl-2,5-dichloroterephthalate with 2,2'-(2,5-dichloro-p-phenylenedioxy)diethanol had a melting point of 223–238° C. It is useful in the manufacture of film and plastic.

Example 7

A mixture of 7.74 g. (0.02 mole) of diphenyl-2,5-dichloroterephthalate, 3.52 g. (0.02 mole of 3,3'-ethylenedioxybis(propylamine) and 5 ml. of Dowtherm A was placed in a 100 ml. flask provided with an inlet and outlet for nitrogen, a stirrer, and a short reflux column. The mixture was heated at 150° C. until melted and then at 200° C. for 30 minutes. An atmosphere of nitrogen was maintained over the reactants and the mixture was stirred throughout the course of the polymerization. The temperature was raised to 240° C. and heating continued for one hour. At this stage the polymer had begun to build up and had separated from the Dowtherm. A low vacuum was applied to distill off the Dowtherm and phenol formed in the reaction. The temperature was increased to 260° and the pressure lowered to 0.5 mm. The melt viscosity of the polymer was very high in 30 minutes. Fibers pulled from the melt were tough and could be cold drawn. A tough, slightly hazy film could be cast from formic acid.

The polymer was observed under crossed nicols on the hot stage of a microscope. It started melting or flowing at 190° C. and was completely melted at 210° C. The inherent viscosity of the polymer, as determined in a solvent mixture of 60 phenol-40 tetrachloroethane, was 1.49. This polymer is useful in the manufacture of fibers, plastics, and films where a higher melting point is not required.

Example 8

The diphenyl ester of monochloroterephthalate was used in Example 7 in place of the dichloroterephthalate ester. The resulting polymer had a melting range of 165–195° C. Its inherent viscosity was 1.21. It is useful in the molding of plastics because it remains transparent after molding but its melting point is below the range for fiber and film-forming polymers contemplated by this invention.

Example 9

The following ingredients were placed in a thick-walled tube constricted at one end: 2.32 g. (0.006 mole) of diphenyl-2,5-dichloroterephthalate, 1.27 g. (0.004 mole) of diphenyl isophthalate, and 1.36 g. (0.01 mole) of m-xylene-$\alpha,\alpha'$-diamine. The tube was partially evacuated and bled to nitrogen and then sealed off under vacuum. It was heated at 260° C. for one hour. A clear resin was obtained. The resin was broken out of the tube and the phenol removed under vacuum at 200° C. The polymer was ground to a particle size of 0.02 inch, and the powder was heated under vacuum at 230° for one hour. The resulting polymer had a melting range of 243–281° C. It had an inherent viscosity of 1.03. It is valuable in the production of films, fibers, and plastics by melt extrusion.

In the preparation of polyamides that melt higher than about 270° C., it is sometimes advantageous to use the solid-phase polymerization process. That is, a prepolymer having an inherent viscosity of 0.2–0.4 is first made. The prepolymer is then granulated or pulverized and heated in a vacuum or inert atmosphere at a temperature somewhat below the melting point until the desired viscosity is obtained.

Example 10

A polyamide was prepared from ditolyl-2,5-dichloroterephthalate and 3-methylhexamethylenediamine by the method described in Example 9. It had a melting point range of 279–292° C. and an inherent viscosity of 0.93. This polymer could be spun into fibers having high tenacity and elastic modulus and can be extruded to form valuable films. This polyamide had exceptionally valuable properties as to the various qualities discussed hereinabove.

Example 11

A polyamide was prepared from 2,2',6,6'-tetrachloro-4,4'-diphenic acid and N-methylhexamethylenediamine by aminolysis of the ditolyl ester as described above. This polyamide had a softening range of 193–231° C. and is useful as a molding plastic and for other purposes.

Example 12

A polyester was prepared from dimethyl-2,5-dichloroterephthalate and 2,5-norcamphanedimethanol. This polymer melted at 208–226° C. It is very stable to hydrolysis and is valuable in the production of films and plastic.

Example 13

A polyester was prepared from dimethyl-2,5-dichloroterephthalate and p-xylene glycol. The melting point of the polymer was 228–240° C. It is useful in the manufacture of fiber, film, and plastic.

Example 14

A polyamide was prepared from diphenyl-2,5-dichloroterephthalate and 2-methyl-1,3-propanediamine. It had a melting range of 296–311° C. The elastic modulus of spun fibers was 93.

Example 15

A polyamide was prepared from diphenyl-2,5-dichloroterephthalate and 3,3'-(cyclohexylenedimethylenedioxy)bis-propylamine by the method described in Example 7. The polymer melted in the same range as that in Example 7 and can be used in the same applications.

The polyesters and polyamides of this invention are distinctly different classes of polymers and are considered together in this application only because they are amenable to the use of language permitting claiming generically; moreover, they are also inter-related as to polyesteramides.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing a polyamide from an aryl diester of a nuclearly polychlorinated aromatic dicarboxylic acid and an equimolecular proportion of an organic bifunctional aliphatic diamine containing at least 4 carbon atoms, said aryl diester being composed of an aromatic hydrocarbon group having two nuclearly attached carbaryloxy radicals and from two to four nuclearly attached chlorine atoms, said process comprising the steps of (A) heating said aryl diester and said aliphatic diamine under a vacuum at from 200°–350° C. until a prepolymer is obtained having a degree of polymerization corresponding to an inherent viscosity of from about 0.1 to about 0.5, (B) pulverizing said prepolymer to form a powder, (C) heating said prepolymer powder at below its melting point and above about 175° C. until a powder of said polyamide is obtained having an inherent viscosity in the range of 0.5–3.0.

2. A process as defined by claim 1 wherein said aryl diester is diphenyl 2,5-dichloroterephthalate and said aliphatic diamine is 3-methyl-1,6-hexanediamine.

3. A process as defined by claim 1 wherein said aryl diester is ditolyl 2,5-dichloroterephthalate and said aliphatic diamine is 3-methyl-1,6-hexanediamine.

References Cited by the Examiner

UNITED STATES PATENTS

| | | | |
|---|---|---|---|
| 2,547,113 | 4/51 | Drewitt et al. | 260—75 |
| 2,551,732 | 5/51 | Drewitt | 260—75 |
| 2,621,168 | 12/52 | Ross et al. | 260—75 |
| 2,819,247 | 1/58 | Lundberg | 260—75 |
| 2,828,290 | 3/58 | Caldwell | 260—75 |
| 2,901,466 | 8/59 | Kibler et al. | 260—75 |
| 2,912,409 | 11/59 | Nischk et al. | 260—75 |
| 2,921,925 | 1/60 | Phillips et al. | 260—75 |
| 2,922,779 | 1/60 | Lincoln | 260—75 |
| 2,989,495 | 6/61 | Hare | 260—78 |
| 3,037,964 | 6/62 | Bruson | 260—75 |
| 3,056,773 | 10/62 | Joo et al. | 260—75 |

FOREIGN PATENTS

| | | |
|---|---|---|
| 728,550 | 4/55 | Great Britain. |
| 806,730 | 12/58 | Great Britain. |
| 1,175,362 | 11/58 | France. |

WILLIAM H. SHORT, *Primary Examiner.*

MILTON STERMAN, P. MANGAN, LOUISE P. QUAST, *Examiners.*